(No Model.)

F. C. AVERY.
FLUSH JOINT FOR TUBULAR FRAME CONSTRUCTIONS.

No. 603,244. Patented May 3, 1898.

WITNESSES:
Jos. A. Ryan
Edw. W. Byrn.

INVENTOR
Frederick C. Avery.
BY Munn & Co.
ATTORNEYS.

UNITED STATES PATENT OFFICE.

FREDERICK C. AVERY, OF TOLEDO, OHIO.

FLUSH JOINT FOR TUBULAR-FRAME CONSTRUCTIONS.

SPECIFICATION forming part of Letters Patent No. 603,244, dated May 3, 1898.

Application filed June 28, 1897. Serial No. 642,653. (No model.)

*To all whom it may concern:*

Be it known that I, FREDERICK C. AVERY, of Toledo, in the county of Lucas and State of Ohio, have invented a new and useful Improvement in Flush Joints for Tubular-Frame Constructions, of which the following is a specification.

The object of my invention is to provide a "flush joint" for rigidly connecting at various angles the tubular frames of bicycles, their handle-bars, and seat-posts, and other manufactured articles, such as tubular work on motor-carriages, framework of air-ships, &c.

What is meant by the term "flush joint" is a direct union of one tubular member with the other without any outside forging or fittings. This gives a very neat and light appearance to a bicycle-frame, and to make such a joint that is strong, durable, cheap, and easily constructed is quite a desideratum.

My invention consists in the special construction and arrangement of parts, in which only the two tubes themselves are employed without any extra parts or fittings, as will be hereinafter more fully described with reference to the drawings, in which—

Figure 1:
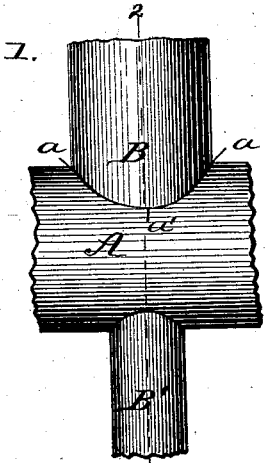
Figure 2:
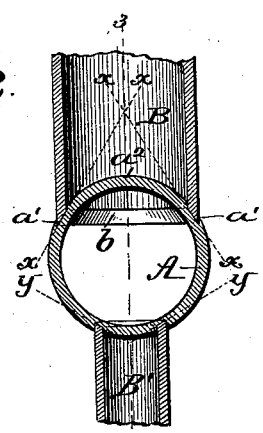
Figure 3:
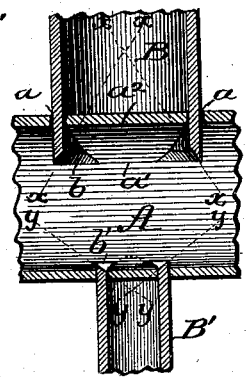
Figure 4:
Figure 5:
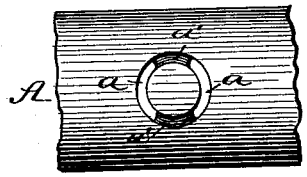
Figure 6:
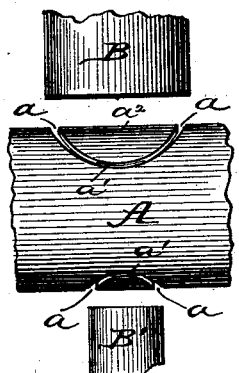
Figure 7:
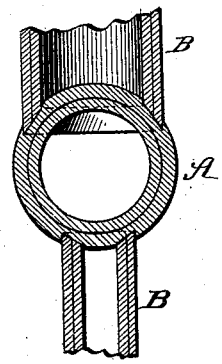

Figure 1 is a side view of my joint, showing different sizes of tubes connected in accordance with my invention. Fig. 2 is a section through line 2 2 of Fig. 1. Fig. 3 is a section through line 3 3 of Fig. 2. Figs. 4 and 5 are plan views, respectively, of the large and small seats in the receiving-tube. Fig. 6 shows juxtaposed side views of the several members in position to go together. Fig. 7 is a detail of a modification, and Fig. 8 is a tubular saw for cutting the seats in the receiving-tube.

In the drawings, A represents what I call the "receiving-tube," and B B' the "entering tubes," which latter are made of different sizes to illustrate the different angular positions of their joint-seats.

Figure 8:
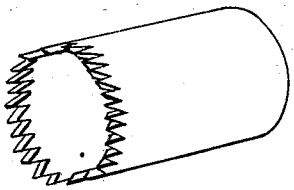

To make the joint, I employ tubular saws, as shown in Fig. 8, which are made exactly of the same diameter as the entering tubes, and with these saws I cut a circular kerf in the receiving-tube, as shown in Figs. 4 and 5, which forms the seat for the end of the entering tube. These saws have teeth beveled off on the inside, so as to form a bevel cut. This causes the kerf to be a complete circle, which is cut entirely through the thickness of the receiving-tube at the middle or high points of the cylinder at $a\ a$, but does not cut through the sides or lower parts of the cylinder at $a'\ a'$, but leaves at such points little bridge-pieces of metal that prevent the central disk from being entirely cut out.

The end of the entering tube is beveled on its inner edge, as seen at $b$ and $b'$. The object of this is to cause the outer surface of the entering tubes B and B' to enter and lie within the kerf at the points $a'\ a'$, (see Fig. 2,) so as to be inside the outer periphery of the receiving-tube and still leave enough of the metal of the receiving-tube at $a'$ in the form of little bridge-pieces that hold the disk part $a^2$ of the receiving-tube in place without being cut away and dropping out of place. To do this, it is necessary to make the splay or inclination of the bevel $b$ on the end of the entering tube of different angles for different diameters of tubes.

Where a large tube B is used and its ends descend nearer to the center of the receiving-tube, the angle $b$ is made quite acute, as seen by the lines $x\ x$ of Fig. 2; but when the entering tube is small in relation to the receiving-tube, as seen at B', the inclination of the bevel is less, as seen by the lines $y\ y$ of Fig. 2. This bevel on the end of the entering tube is very necessary to avoid cutting away entirely the little bridge-pieces $a'\ a'$ of the receiving-tube, for it will be seen that if the end of the entering tube B were square or not beveled at all the little bridge-pieces $a'\ a'$ of the receiving-tube would be entirely cut away and the circular piece $a^2$ of the receiving-tube would fall out.

When the receiving-tube is cut with the circular kerf-seats and the beveled ends of the entering tubes are brought into registration, as in Fig. 6, the bevel end of the entering tube exactly fits the beveled kerf-seat and the parts when joined are brazed together and firmly locked with a flush joint.

For greater strength the entering tubes and the receiving-tubes may be made double or two-ply, as in Fig. 7, to give a reinforce at the point of union; but the manner of cutting, joining, and brazing remains the same, and the joint is composed of only the two members—the entering tube and the receiving-tube.

The object of having every portion of the end of the entering tube pass below the outer surface of the receiving-tube is to make a complete "inserted" flush joint. The object in leaving the center disk in place is to support the inserted tube and also to give additional surface for soldering or brazing.

The complete inserted flush joint is very important in tubular construction, first, because it is firmer and stronger, and, second, it makes a clean and sharp joint, which adds much to the beauty of the tubular joint.

My inserted flush joint does away entirely with all stamping, forging, clips, and dies and makes a simple, cheap, neat, and strong joint, only a simple tubular saw being required to do the work.

My joint is also supported both on the inside and outside all the way around by the continuous circular kerf-seat, and the parts fit together with a braced and interlocked relation independent of the brazing.

Having thus described my invention, what I claim as new, and desire to secure by Letters Patent, is—

1. A flush joint for the angular connection of tubing consisting of a receiving member having a continuous circular kerfed seat cut entirely through the cylindrical side of the tube at two opposite points, and having grooved but uncut bridge-pieces at intermediate points; in combination with the tubular entering member having its end inserted throughout its entire circumference into the circular kerfed seat of the receiving member substantially as and for the purpose described.

2. A flush joint for the angular connection of tubing consisting of a receiving member having a continuous circular kerfed seat cut entirely through the cylindrical side of the tube at two opposite points, and having uncut bridge-pieces at intermediate points with acute angular grooves in them; in combination with the tubular entering member having its end beveled upon the inner side and inserted throughout its entire circumference into the circular kerfed seat of the receiving member substantially as and for the purpose described.

FREDERICK C. AVERY.

Witnesses:
J. C. LINCOLN,
C. C. DAWSON.